United States Patent [19]

Jahr et al.

[11] Patent Number: 5,061,128

[45] Date of Patent: Oct. 29, 1991

[54] MECHANISM FOR THE DRIVE OF A TOOL SPINDLE

[75] Inventors: Andreas Jahr, Neuss; Jorg Weber, Graben-Neudorf, both of Fed. Rep. of Germany

[73] Assignee: Maschinenfabrik Lorenz AG, Ettlingen, Fed. Rep. of Germany

[21] Appl. No.: 464,946

[22] Filed: Jan. 16, 1990

[30] Foreign Application Priority Data

Jan. 16, 1989 [CH] Switzerland .............. 118/89

[51] Int. Cl.$^5$ .............. B23F 5/16; B23F 9/06
[52] U.S. Cl. .............. 409/34; 409/42
[58] Field of Search .............. 409/34, 35, 41, 42

[56] References Cited

U.S. PATENT DOCUMENTS

| 2,103,911 | 12/1937 | Miller | 409/34 |
| 2,126,907 | 8/1938 | Miller | 409/34 |
| 3,097,567 | 7/1963 | Daniel et al. | 409/34 X |
| 4,606,682 | 8/1986 | Miller | 409/34 |
| 4,695,209 | 9/1987 | Noguchi et al. | 409/42 |

FOREIGN PATENT DOCUMENTS 0132416  8/1983  Japan .............. 409/34

Primary Examiner—Z. R. Bilinsky
Attorney, Agent, or Firm—Bachman & LaPointe

[57] ABSTRACT

In a mechanism for the drive of a tool spindle which performs a rotating indexing motion, particularly for the production of gear-wheels, a rocking lever is used which is connected by a displaceable sliding swivel joint to a second member such that linear motion is able to be executed by the second member thereby causing a linear adjusting movement in the indexing mechanism.

20 Claims, 7 Drawing Sheets

MECHANISM FOR THE DRIVE OF A TOOL SPINDLE

BACKGROUND OF THE INVENTION

The present invention relates to a mechanism for the drive of a tool spindle in a rotating indexing manner.

A mechanism for the drive of a tool spindle is the subject of U.S. Pat. No. 4,606,682. In the '682 patent, the tool spindle is connected, through a universal joint, to the connecting rod of a reciprocating drive constructed in the form of an eccentric drive. The tool spindle is surrounded by a guide sleeve, and a straight-line guide is provided between guide sleeve and tool spindle. A worm wheel is disposed on the guide sleeve and a helical guide is provided between the worm wheel and the guide sleeve. The worm wheel is in engagement with a worm which is driven by a motor as a result of which the tool spindle performs an indexing movement. The guide sleeve is in turn articulated on the connecting rod of a further eccentric drive which is connected to the reciprocating drive through a drive chain.

If the tool spindle performs reciprocating axial movements which the guide sleeve held fast, the tool of the tool spindle performs purely linear movements. On the other hand, if the guide sleeve is put into reciprocating axial movement by the further eccentric drive, then, as a result of the helical guide, the tool spindle additionally performs a rotary movement which leads to a helical movement of the tool. Since the two eccentric drives are adjustable with regard to their eccentricity, it is possible to vary the pitch of the helical movement continuously.

A disadvantage of the '682 patent is that it is extremely difficult to adapt the two eccentricities of the eccentric drives to one another so that the desired pitch of the helical movement results precisely.

In a further tool-spindle drive disclosed in DE-0S 33 14 524, a worm wheel is mounted on the tool spindle through a straight-line guide. The worm wheel is again in engagement with a worm, the shaft of which is axially displaceable. The axial displacement of a worm shaft is caused by means of a hydraulic motor which is controlled depending on the reciprocating drive for the tool spindle. If the tool spindle performs a reciprocating axial movement, the worm shaft is simultaneously moved backwards and forwards axially so that the tool spindle performs a helical movement. The pitch of the helical movement can be varied depending on the direction and amplitude of the reciprocating axial movement of the worm shaft.

A disadvantage of the '524 patent is that it is practically impossible to synchronize the two axial movements with one another with the necessary accuracy in order to obtain the desired pitch of the helical movement.

A further tool-spindle drive mechanism is the subject of U.S. Pat. No. 4,695,209. The mechanism comprises a guide sleeve which is connected on the one hand to a tool spindle and on the other hand to a worm wheel for rotation therewith through, in each case, a helical guide. The two helical guides have the same pitch but in opposite directions. A first rocking lever is in engagement with the tool spindle and extends substantially at right-angles thereto, which rocking lever is articulately connected to an articulated lever which extends substantially parallel to the tool spindle. Articulated on this articulated lever is a second rocking lever which extends parallel to the first rocking lever and is in engagement with the guide sleeve. The one rocking lever has a pivot point fixed to the frame, which pivot point is displaceable along this rocking lever. The pivot point of the other rocking lever, which is fixed to the frame, is not adjustable. If the position of the displaceable pivot point is altered, the leverage is altered in the one rocking lever. The foregoing results in a variation in the pitch of the helical movement of the tool spindle which is not proportional to the variation in the position of the pivot point. A further disadvantage is that the ends of the rocking levers move over circular paths and so the lines of action of the transmission forces vary continuously, which is unfavorable for the whole stability, the bearing loading and hence for the tooth accuracy which can be achieved.

It would be highly desirable to improve the mechanism of the kinds mentioned above so as to achieve a linear adjustment of the pitch of the helical movement.

The foregoing object is achieved by way of the present invention by the provision of a two-part sliding loop with a sliding swivel joint between the two members, the rocking lever, as one member, only transmits linear movements to the other member and this sliding swivel joint can be displaced and located along the two members so that the pitch of the helical movement can be altered. Thus, a simple and very accurate manner of adjustment of the pitch of the helix of the workpiece to be produced results with a simultaneous simpler and more robust construction of the drive, which also renders possible a high stroke frequency. The pivot point of the rocking lever which is fixed to the frame is not adjustable in its position.

BRIEF DESCRIPTION OF THE DRAWINGS

Examples of embodiment are explained in more detail below with reference to the drawings.

DETAILED DESCRIPTION

Figure 1:
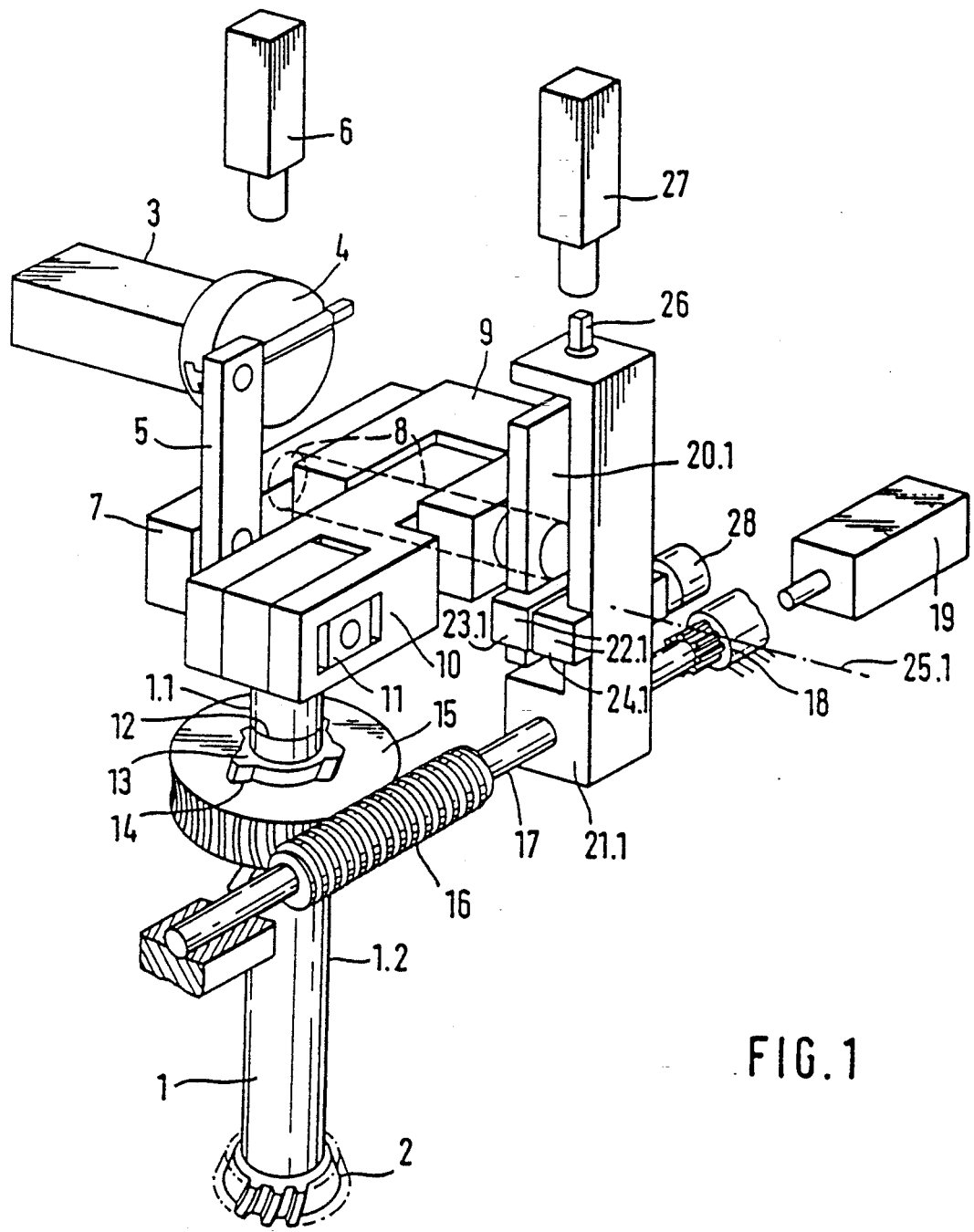
FIG. 1 shows the perspective view of a first example of embodiment.

In the example of embodiment according to FIG. 1, the tool spindle 1, which carries the tool 2 at its end, is set in a reciprocating axial movement by a reciprocating drive. The reciprocating drive consists of a driving motor 3 which sets a crank disc 4 in rotation, on which a connecting rod 5 is articulated eccentrically. The eccentricity of this articulation can be adjusted through an adjusting motor 6. At its other end, the connecting rod 5 is articulated on a first rocker arm 7 which is rigidly connected to the rotary shaft 8. This rotary shaft 8 is mounted in the bearing member 9 fixed to the frame.

Connected thereto for pivoting with it is a second rocker arm 10 which extends parallel to the first rocker arm 7 which supports a pivoting and sliding joint 11 in a bearing, which joint in turn supports the upper portion of the tool spindle 1 in a bearing. Thus, on actuation of the reciprocating drive, the tool spindle performs reciprocating axial movements.

The tool spindle 1 is made in two parts, the upper part 1.1 being connected to the lower part 1.2 through a thrust bearing 12. This thrust bearing 12 secures the lower part 1.2 in relation to the upper part 1.1 in the axial direction but permits a rotary movement of the lower part 1.2 in relation to the upper part 1.1 supported in the joint 11.

A helical guide 13, as is known in the art, is rigidly mounted on the lower part 1.2 of the tool spindle 1 and engages in a helical guide 14 of a worm wheel 15. This worm wheel 15 is held against axial movement. Worm wheel 15 is in engagement with a worm 16 which is provided on a worm shaft 17. This worm shaft 17 is in communication with a driving motor 19 through a sliding sleeve 18.

The rotating indexing motion of the tool spindle 1 is produced through the driving motor 19, the sliding sleeve 18, the worm shaft 17, the worm 16 and the worm wheel 15, the helical guide 14 of which is in engagement with the helical guide 13 of the lower part 1.2 of the tool spindle 1.

If the worm wheel 15 is held fixed during the reciprocating axial movement of the tool spindle 1, the tool spindle 1 performs a rotary movement at the same time because of the helical guides 13, 14 of the lower part 1.2. The extent of this rotary movement depends on the pitch of the helical guides 13, 14. Thus, the tool performs a helical movement, the pitch of which is determined by the pitch of the helical guides 13, 14.

In order to be able to alter the pitch positively or negatively, a rocking lever 20.1 is rigidly connected to the shaft 8, which rocking lever is preferably arranged at right-angles to the rocker arms 7, 10 and comprises an arm at each side of the shaft 8. Extending substantially parallel to this rocking lever 20.1 is a displacement member 21.1 which supports the worm shaft 17 at its lower end for rotation but not for axial displacement.

Disposed between the rocking lever 20.1 and the displacement element 21.1 is a sliding swivel joint 22.1. In the example of embodiment illustrated, this sliding swivel joint 22.1 consists of a two-part sliding block, of which the sliding-block parts 23.1 and 24.1 are connected to one another for rotation about an axis 25.1. The axis of rotation 25.1 extends at right angles to the rocking lever 20.1 and to the displacement element 21.1.

Cooperating with the sliding swivel joint 22.1 is an adjusting spindle 26 which can be coupled to an adjusting motor 27 so that the sliding swivel joint 22.1 can be adjusted along the rocking lever 20.1 and the displacement element 21.1. Cooperating with the sliding-block part 24.1 is a locking device 28 whereby the sliding-block part 24.1 can be locked to the displacement element 21.1.

Thus, the rocking lever 20.1, the sliding swivel joint 22.1 and the displacement element 21.1 form a sliding coupling consisting of two members, wherein the reciprocating rotary movement of the rocking lever 20.1 is converted into a reciprocating axial movement of the worm shaft 17, the amplitude of which is dependent on the distance of the axis of the shaft 8 from the axis 25.1 of the sliding swivel joint 22.1.

This axial movement of the worm shaft 17 is transmitted, as a rotary movement, via the worm 16 to the worm wheel 15 and hence as an additional rotary movement to the lower part 1.2 of the tool spindle 1. This additional rotary movement is superimposed on the rotary movement which results in consequence of the helical guides 13, 14. According to whether the sliding swivel joint 22.1 assumes a position above or below the axis of the shaft 8, the rotary movement caused by the helical guide 14 is thus increased or reduced. If the sliding swivel joint 22.1 is at the height of the shaft 8, the additional rotary movement is equal to zero, that is to say the rotary movement performed by the tool spindle 1 during the axial movement corresponds precisely to the rotation caused by the pitch of the helical guides 13, 14.

Figure 2:
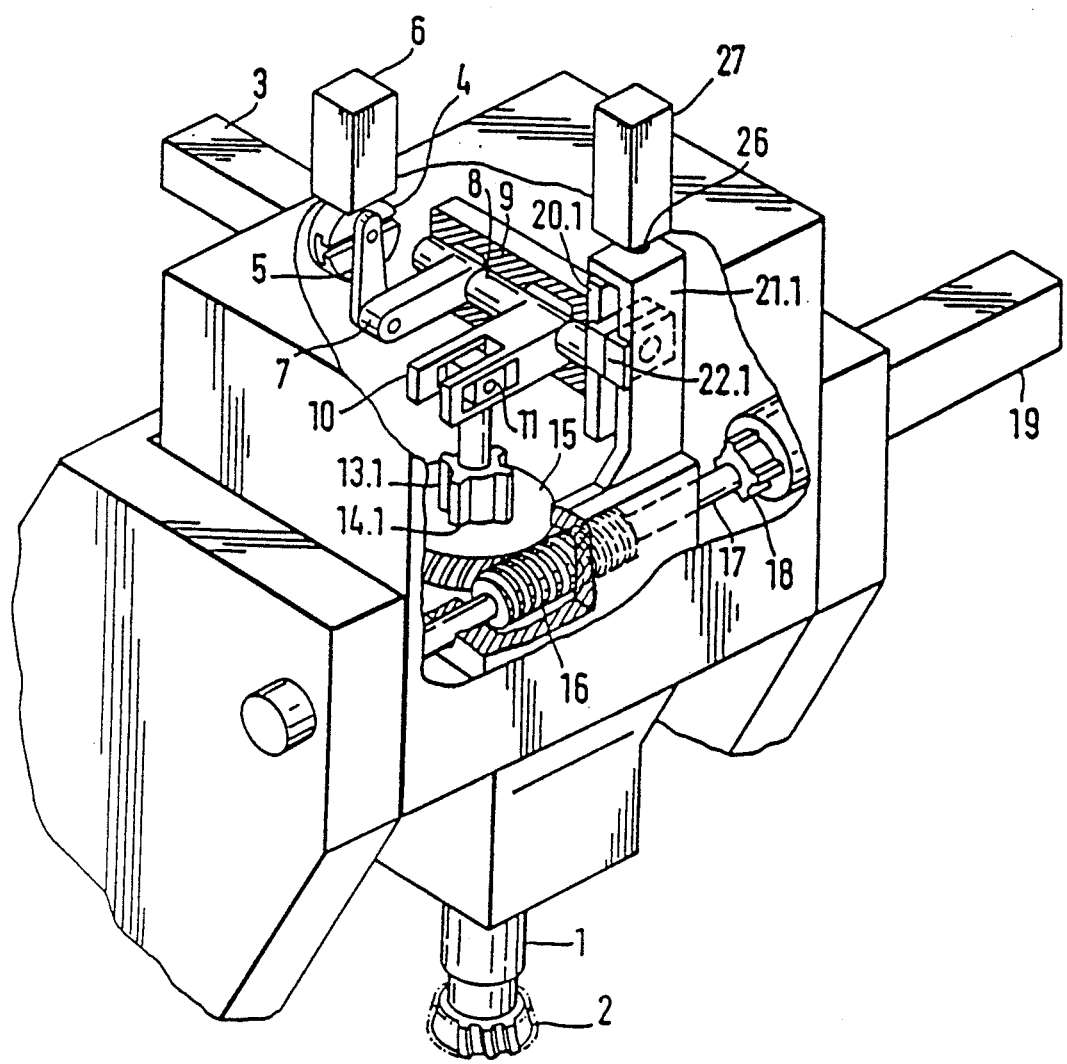
FIG. 2 shows a perspective view of a modification of the first example of embodiment.

In the modified embodiment shown in FIG. 2, the conditions are the same as in the form of embodiment shown in FIG. 1 with the difference that guides 13.1 and 14.1, which are straight-line guides and not helical guides, are provided between the worm wheel 15 and the lower part 1.2 of the tool spindle 1.

In this embodiment, if the sliding swivel joint 22.1 is at the height of the shaft 8, the tool spindle 1 only performs reciprocating axial movements but not rotary movement (pitch of the helical movement infinite). On the other hand, if the sliding swivel joint 22.1 is displaced upwards or downwards and locked to the displacement member 25.1 by means of the locking device 28, the tool spindle 1 performs a rotary movement during its axial movement, the pitch of the resulting helical movement of the tool 2 being smaller, the greater the distance of the sliding swivel joint 22.1 from the shaft 8.

In the following embodiments to be described below, the parts which are the same have the same reference numerals as the parts in FIGS. 1 and 2.

Figure 3:
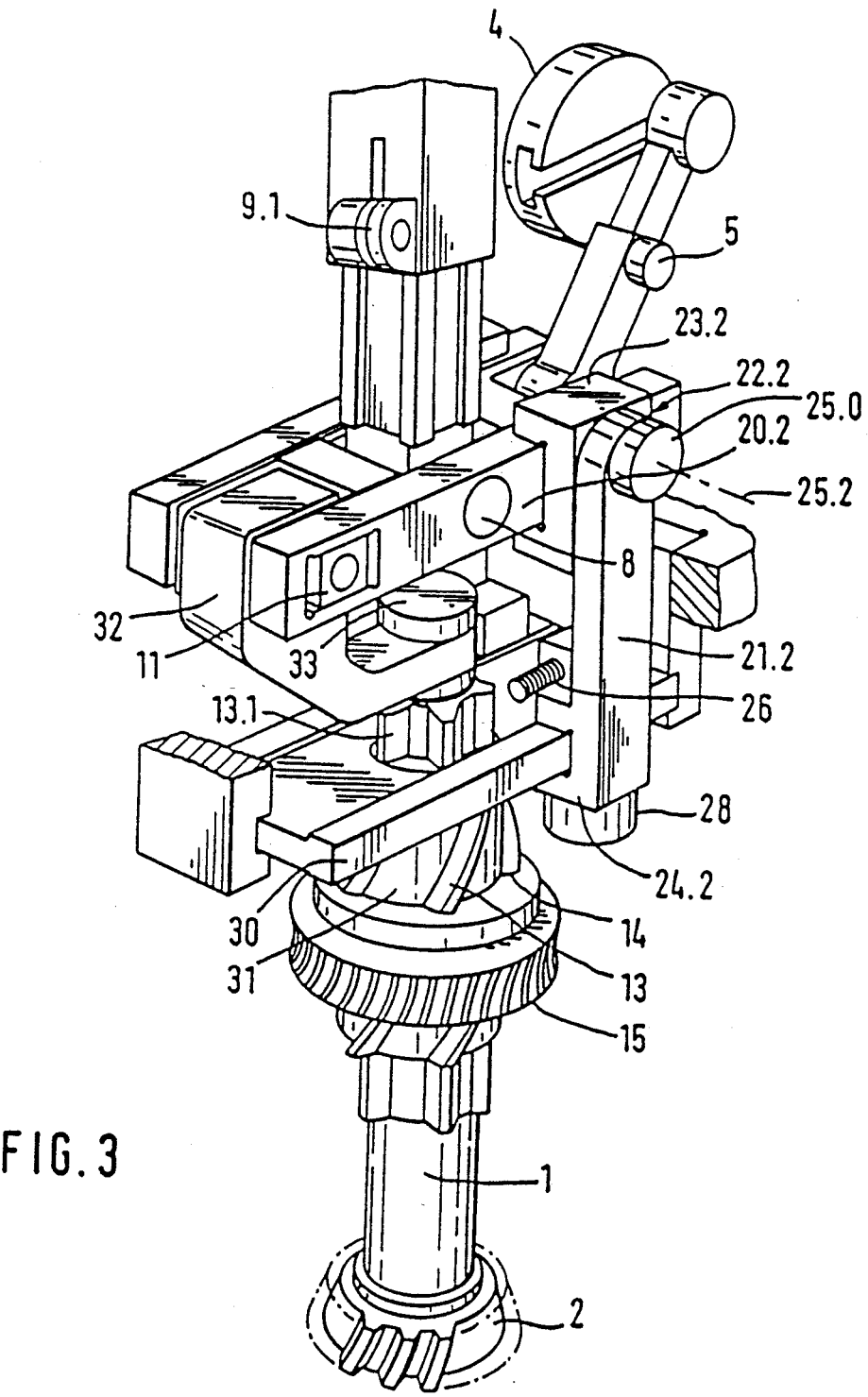
FIG. 3 shows the perspective view of a second example of embodiment.

In the embodiment shown in FIG. 3, the connecting rod 5 driven by the crank disc 4 acts on the two-part rocking lever 20.2 which is supported for rotation about a fixed position or the frame by the shaft 8 which in turn is supported by the bearing member 9.1 fixed to the frame. At the opposite end to the connecting rod, the two-part rocking lever 20.2 supports the sliding swivel bearing 11 which supports a cranked lever 32 which in turn supports the tool spindle 1 secured axially via a pivot bearing 33. The tool spindle 1 comprises a straight-line guide 13.1 which cooperates with a corresponding straight-line guide of a guide sleeve 31 which surrounds the tool spindle 1. On the outside, this guide sleeve 31 comprises a helical guide 13 which is guided in a corresponding helical guide 14 of the worm wheel 15.

The guide sleeve 31 is supported for rotation in a displacement plate 30 but held against axial displacement in relation to this. The displacement plate 30 is secured against rotation but can move in the direction of the axis of the tool spindle 1. It extends substantially parallel to the two-part rocking lever 20.2.

Extending between the rocking lever 20.2 and the slide plate 30, at right angles to these, is a displacement element 21.2. This displacement element has, at the top, a sliding-block member 23.2 which is connected, through a pivot bearing 25.0, to the displacement element 21.2. The axis of rotation, which extends at right angles to the locking lever 20.2 and to the displacement element 21.2, is designated by 25.2. The lower end of the displacement element 21.2 is likewise constructed in the form of a sliding block 24.2 which can be locked to the slide plate 30 by means of a locking device 28. Furthermore, acting on the displacement element 21.2, a spindle 26 whereby, with the locking device 28 released, the displacement element 21.2 can be displaced along the rocking lever 20.2 and the displacement plate 30.

If the crank assembly gives the rocking lever 20.2 a rocking motion about the shaft 8, this rocking motion is converted, via the bearing 11, the lever 32 and the bearing 33 into a reciprocating axial movement of the tool spindle 2. If the displacement element 21.2 is in a position in which the axis of rotation 25.2 of the swivel joint 25.0 is in the vertical plane of the axis of the shaft 8, the spindle 1 performs an axial movement on which no rotary movement is superimposed. On the other hand, if the displacement element 21.2 is in a position to the right or left of the shaft 8, the rocking motion of the rocking lever 20.2 is converted into a linear upward and downward movement of the displacement element 21.2 and hence of the displacement plate 30 and of the guide sleeve 31. Thus, with the worm wheel 15 locked, the axial movement of the guide sleeve 31 is converted, via the inclined guides 13, 14 and the straight-line guide 13.1 into a rotary movement of the tool spindle 1. The pitch of the resulting helical movement of the tool 2 depends on the pitch of the helical guides 13, 14 and on the distance of the displacement element 21.2 from the shaft 8. According to whether the displacement element 21.2 is on the right or the left of the shaft 8, this pitch can be altered positively or negatively.

Here, too, the rocking lever 20.2, the sliding swivel joint 22.2 composed of the sliding-block member 23.2 and the pivot bearing 25.0, and the displacement element 21.2 form a sliding coupling wherein the sliding swivel joint 22.2 can be displaced continuously along the rocking lever 20.2 and be locked by the locking device 28.

The devices shown in FIGS. 1 to 3 can be combined with one another. According to FIGS. 1 and 2, the displacement element 21.1 performs horizontal linear movements, whereas the displacement element 21.2 shown in FIG. 3 performs vertical linear movements. It is possible, for example by means of a wedge surface, to convert the horizontal movements of the displacement element 21.1 into linear vertical movements in order to be able to move the slide plate 30 upwards and downwards thereby. In a corresponding manner, it is possible to convert the vertical movements of the displacement element 21.2 into horizontal movements by means of this wedge surface in order to reciprocate the worm shaft 17 thereby.

With regard to the form of embodiment according to FIG. 3, it should also be noted that the length of the connecting rod 5 is variable and the horizontal shaft 8 can be adjusted in height by varying the length of the bearing member 9.1 at the frame side.

Whereas in the form of the embodiments of FIGS. 1 through 3 previously described, the rocking lever 20 performs movements of a rocker arm of the reciprocating drive about the axis of the shaft 8, in the following embodiments, the axial movements of the tool spindle 1 are taken off from the rocking lever or transmitted to this. Thus, in the forms of embodiment according to FIGS. 1 to 3, the turning and sliding joint 22 has converted a rotary movement of the rocking lever 20 into a linear movement of the displacement element 21 in each case.

In the following embodiments, a further turning and sliding joint is provided which converts the linear axial movements of the tool spindle 1 into reciprocating circular movements of one or two rocking levers and then the turning and sliding joint previously described converts these reciprocating circular movements into reciprocating linear movements for the drive of the indexing mechanism.

Figure 4:
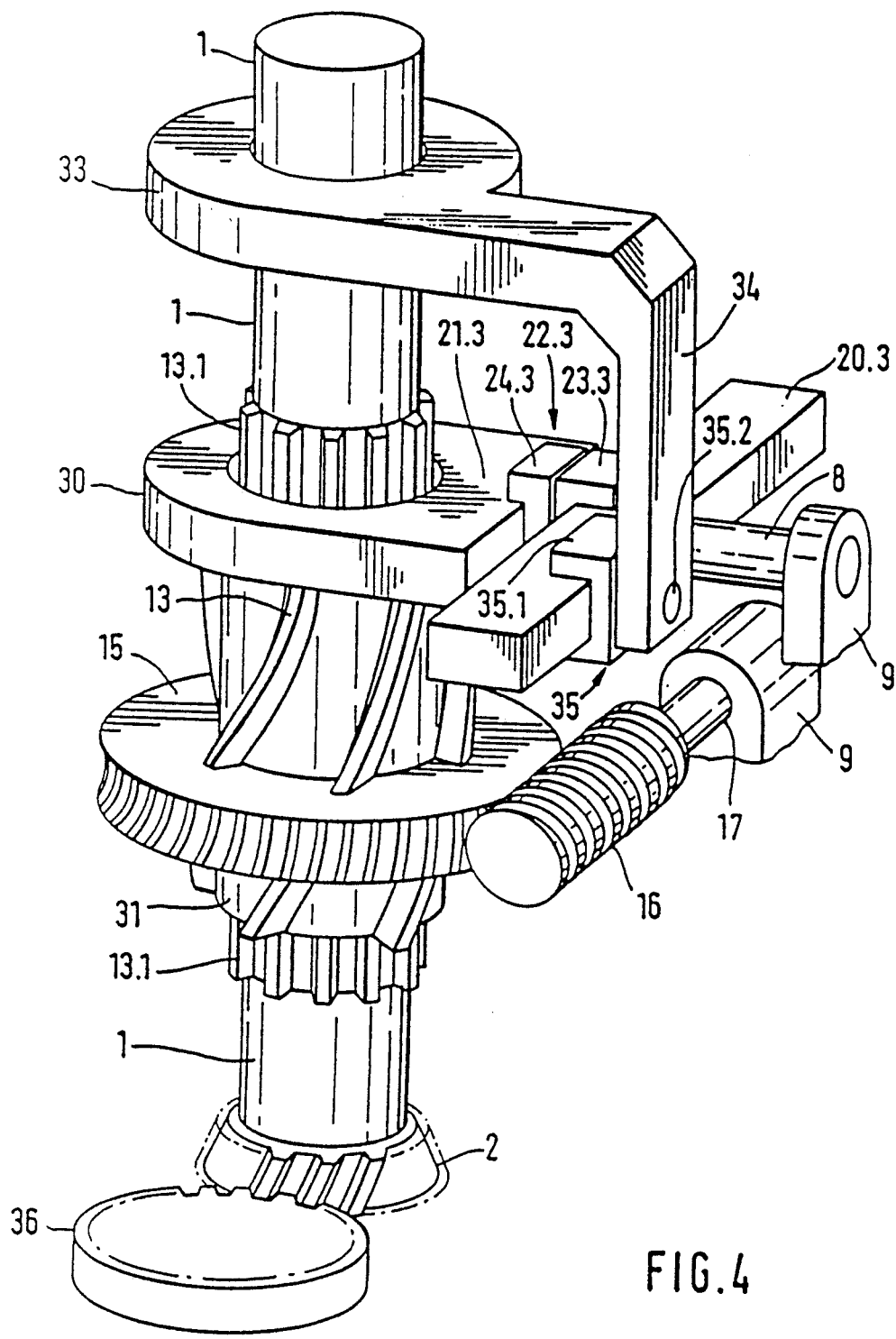
FIG. 4 shows the perspective view of a third example of embodiment.
Figure 5:
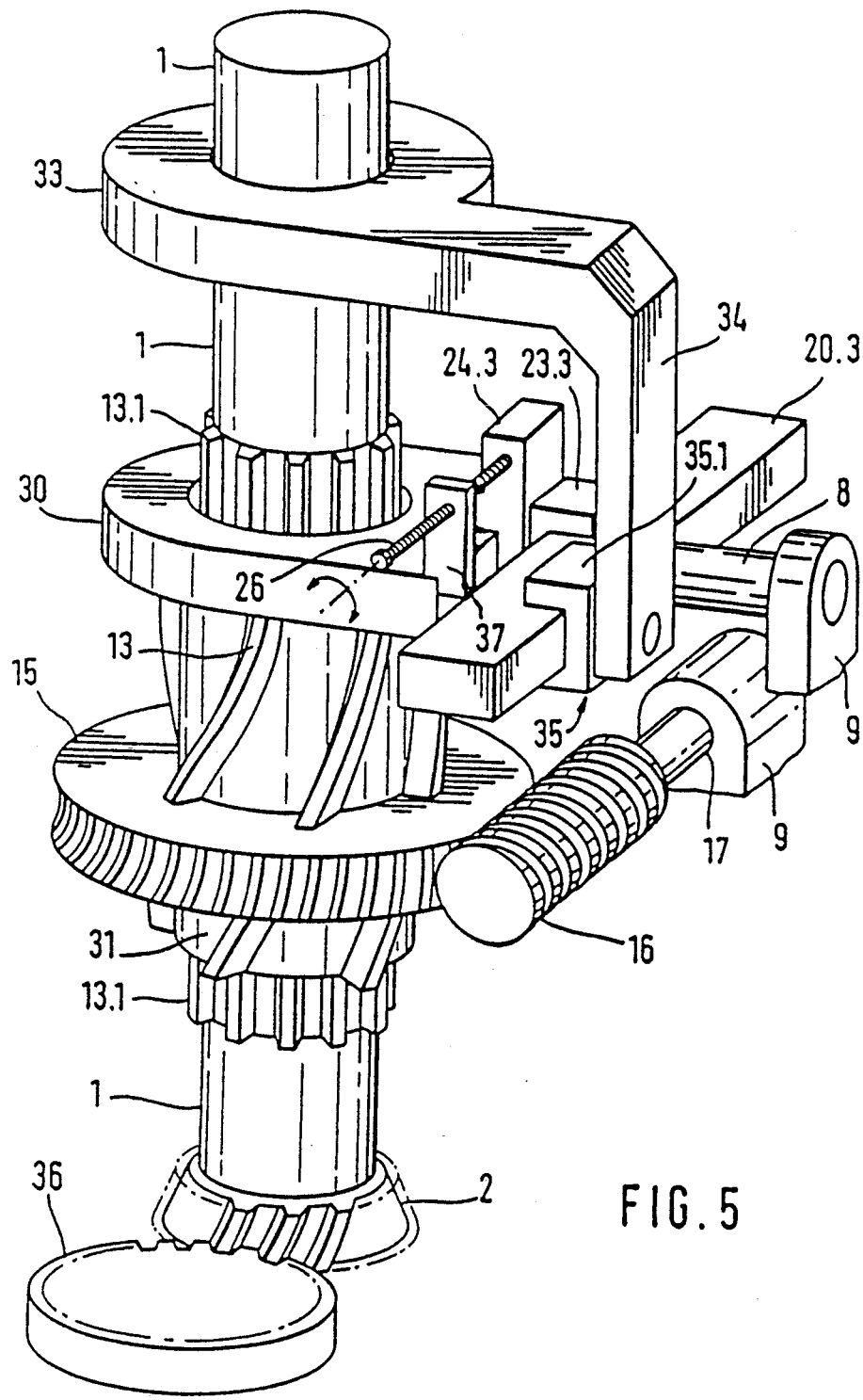
FIG. 5 shows a perspective illustration of the third example of embodiment supplemented by a possibility for adjustment.
Figure 7:
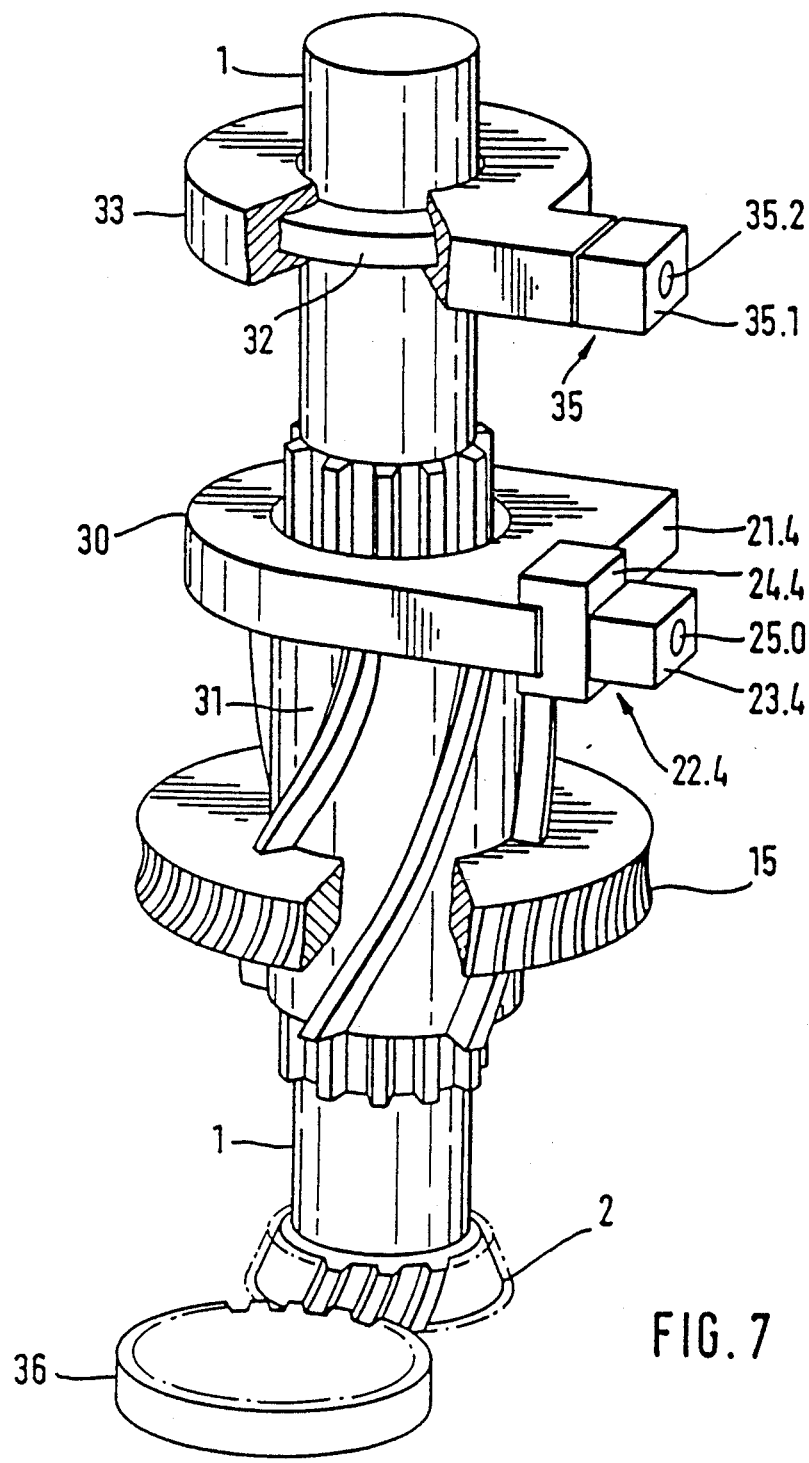
FIG. 7 shows a perspective view of a fourth example of embodiment in order to explain its mode of operation better.

According to FIGS. 4 and 5, the tool spindle 1 comprises a ring 32 which is rigidly connected thereto and which is illustrated in FIG. 7. This ring is surrounded by a collar member 33 which comprises an arm 34 extending downwards. The collar member 33 and the arm 34 are thus moved linearly upwards and downwards by the tool spindle 1. At the lower end of the arm 34, there is provided a sliding swivel 35 which consists of a sliding-block member 35.1 and a pivot bearing 35.2, and the latter connects the arm 34 to the sliding-block member 35.1. The sliding block member 35.1 is in engagement with the rocking lever 20.3 which is mounted for rotation fixed to the frame by the shaft 8. The rocking lever 20.3 extends substantially at right angles to the tool spindle 1.

Disposed between the displacement plate 30 constructed in the form of a displacement element 21.3 and the rocking lever 20.3 is the sliding swivel joint 22.3 which consists of a first sliding-block member 23.3 and a second sliding-block member 24.3 which are connected to one another through a pivot bearing. The pivot bearings of the two sliding swivel joints 35 and 22.3 each have axes of rotation extending parallel to the axis of the shaft 8. The sliding-block member 24.3 can be locked on the displacement member 21.3 which extends substantially parallel to the rocking lever 20.3. The sliding swivel joint 22.3 is displaceable continuously along the displacement element 21.3 and along the rocking lever 20.3 and can be locked to the displacement element 21.3 in each position of displacement. According to the position of the sliding swivel joint 22.3 to the right or left of the shaft 8, the pitch of the helical movement is altered positively or negatively.

A further possibility for variation can be achieved if the other sliding swivel joint 35 is also adapted for displacement along the rocking lever 20.3.

In FIGS. 4 to 7, the workpiece to be machined by the tool 2 is illustrated and designated by 36.

A possibility for continuous adjustment of the sliding swivel joint 22.3 is illustrated in FIG. 5. Fixed to the displacement plate 30 is a bearing block 37 through which there extends an adjusting spindle 26 which is in engagement with the sliding-block member 24.3 with which the sliding swivel joint 22.3 can be displaced along the displacement element 21.3 and hence along the rocking lever 20.3. If the adjusting spindle 26 is supported appropriately stably in the bearing block 37 and in the sliding-block member 24.3, a locking device can be omitted on the sliding-block member 24.3.

Figure 6:
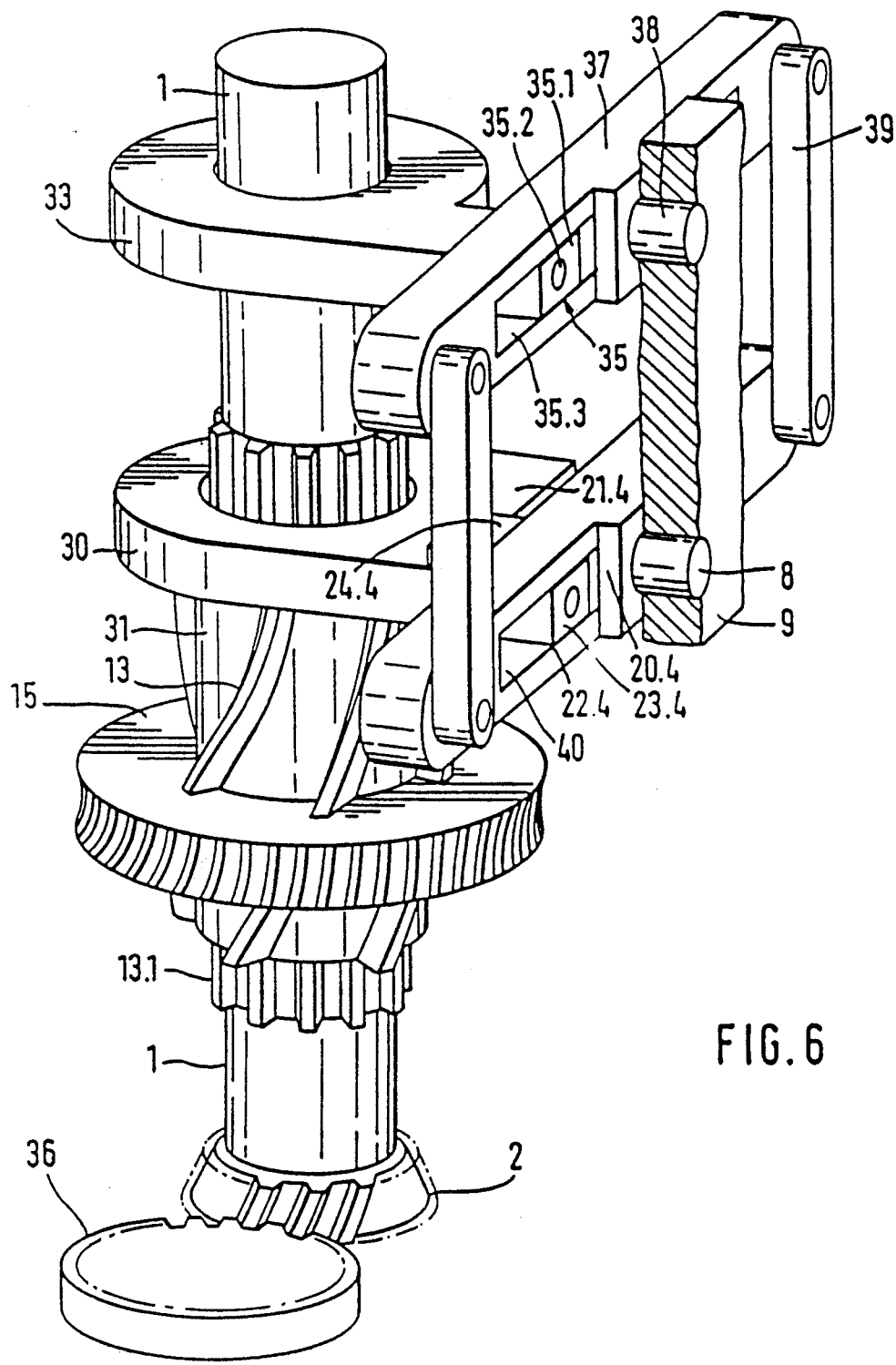
FIG. 6 shows the perspective view of a fourth example of embodiment.

In the form of the embodiment shown in FIGS. 6 and 7, two rocking levers 20.4 and 37 are provided. The rocking levers extending parallel to one another are mounted for rotation on the side of the frame by the shafts 8 and 38. At least at one end, they are connected to one another by an articulated lever 39 through a pivot joint. An additional connection through a further articulated lever may be provided at the other end of the rocking levers.

The collar member 33 is connected to the rocking lever 37 through a sliding swivel joint 35. It comprises a sliding-block member 35.1 and a pivot bearing 35.2. The sliding-block member is guided in a longitudinal guide 35.3 of the rocking lever 37 and connected to the collar member 33 through the pivot bearing 35.2.

The lower rocking lever 20.4 is kinematically connected to the displacement element 21.4 of the displacement plate 30 through the sliding swivel joint 22.4 which is displaceable and locatable along the rocking lever 20.4 and the displacement element 21.4. This displaceable sliding swivel joint 22.4 comprises a sliding-block member 23.4 and a further sliding-block member 24.4 which can be connected to one another through the swivel joint 25.0. The sliding-block member 24.4 is made U-shaped and can be locked on the displacement element 21.4. The other sliding-block member 23.4 is guided in a longitudinal guide 40 which extends at both sides of the shaft 8.

Here, too, there is an additional possibility of adjustment for the pitch of the helical movement if the sliding swivel joint 35 is adapted for displacement and location along the rocking lever 37 and the collar member 33.

Some further advantages:

With linear dependence of the pitch of the helix to be achieved on the extent of the adjustment, this pitch can be adjusted by simpler means than with non-linear dependence.

The spacing to be adjusted is on a member which is moved only by sliding. It always lies in a horizontal line. The means for adjusting it can be simpler than those which are necessary to adjust a spacing on a rotating member.

The adjustment can be effected and measured by simple means even when the rocker is inclined.

In the modifications given, a direct adjustment of the quantity determining the helix angle (vertical distance of the axis of rotation of the journal bearing between the sliding-block members 23.1 and 24.1 and the axis of rotation of the ram spindle) is possible A simpler construction of such a device is possible as a result of the invention and lower costs are incurred.

In the mechanism according to the present invention, fewer bearing locations are needed so that fewer components are necessary and therefore a greater manufacturing accuracy is achieved in the workpieces produced.

As a result of the smaller number of moving parts, less vibration occurs in the system and therefore lower power losses.

It is to be understood that the invention is not limited to the illustrations described and shown herein, which are deemed to be merely illustrative of the best modes of carrying out the invention, and which are susceptible of modification of form, size, arrangement of parts and details of operation. The invention rather is intended to encompass all such modifications which are within its spirit and scope as defined by the claims.

What is claimed is:

1. A mechanism for the drive of a tool spindle which performs a rotating indexing motion, an axial movement and at the same time a rotary movement, comprises a reciprocating drive means kinematically connected to the tool spindle for performing the axial movement, an indexing mechanism connected to the tool spindle and arranged coaxially therewith for rotation therewith for performing the indexing movement, and at least one rocking lever provided with a pivot point fixed to a frame and kinematically connected to the tool spindle and the indexing mechanism for performing the rotary movement, said at least one rocking lever comprises at least one lever arm which is adjustable in its length for varying the pitch of the helical movement resulting from the axial movement and the rotary movement, further comprising a sliding coupling consisting of at least two members, wherein one member is a rocking lever which is connected to the other member through a sliding swivel joint having a sliding guide, the sliding swivel joint is continuously displaceably mounted along the rocking lever and is selectively located in the displacement positions, wherein the axis of rotation of the sliding swivel joint and hence the other member executes a linear movement while the sliding guide of the sliding swivel joint performs a movement perpendicular thereto, whereby the linear movement of the other member causes a linear adjustment movement in the indexing mechanism.

2. A mechanism according to claim 1 wherein the sliding swivel joint is fixed to the other member and the sliding guide slides along the rocking lever.

3. A mechanism according to claim 1 wherein the sliding guide of the sliding swivel joint consists of a sliding-block member sliding along the rocking lever.

4. A mechanism according to claim 1 wherein the pivot point of the at least one rocking lever, is arranged substantially in the middle and the sliding swivel joint can be displaced and located along the rocking lever.

5. A mechanism according to claim 1 wherein the rocking lever comprises a plurality of levers driven by the reciprocating drive.

6. A mechanism according to claim 1 wherein the rocking lever comprises a plurality of levers driven by the tool spindle and said sliding swivel joint is disposed between the rocking lever on the one hand and the tool spindle and the other member on the other hand.

7. A mechanism according to claim 6 wherein one of the plurality of rocking levers is connected by an articulated lever to a further rocking lever which is mounted on a pivot point fixed to the frame, and, through a further sliding swivel joint, mounted to the tool spindle.

8. A mechanism according to claim 1 wherein the indexing mechanism comprises a worm wheel which is mounted on the tool spindle for rotation therewith wherein the worm wheel engages the other member and is turned thereby.

9. A mechanism according to claim 1 wherein the indexing mechanism comprises a guide sleeve which is connected to the tool spindle and a worm wheel for rotation therewith wherein the indexing mechanism is displaced by the other member and wherein one of the connections for rotation consists of a helical guide.

10. A mechanism according to claim 8 wherein the other member is a displacement element extending substantially parallel to the rocking lever wherein the rocking lever extends substantially perpendicular to a rocker arm means on the reciprocating drive which causes axial movement of the tool spindle.

11. A mechanism according to claim 10 wherein the displacement element supports a worm shaft for rotational movement in a bearing wherein a worm gear on the worm shaft is in engagement with the worm wheel.

12. A mechanism according to claim 11 wherein the worm shaft is connected, through a sliding sleeve to an adjusting motor for the indexing mechanism.

13. A mechanism according to claim 9 wherein the rocking lever is a rocker arm of the reciprocating drive which causes the axial movement of the tool spindle and the other member is a displacement element extending substantially perpendicular to the rocking lever.

14. A mechanism according to claim 13/wherein the displacement member can be displaced and locked in position along a displacement plate extending perpendicular to it wherein displacement plate supports a guide sleeve in a bearing for rotation but not for axial displacement relative thereto.

15. A mechanism according to claim 9 wherein a collar member is connected to the tool spindle in an axially non-displaceable manner and is connected, through a further sliding swivel joint to the rocking arm which in turn is connected, through the one sliding swivel joint, to the other member.

16. A mechanism according to claim 15 wherein the other member is constructed as a displacement element having a displacement plate which supports the guide sleeve in a bearing for rotation but not for axial displacement relative thereto.

17. A mechanism according to claim 9 wherein a collar member is connected to the tool spindle in an axially non-displaceable manner and is connected, through the further sliding swivel joint, to the further rocking arm, and wherein the rocking arm is connected through the one sliding swivel joint to the other member constructed in the form of a displacement element having a displacement plate which supports the guide sleeve in a bearing for rotation but not for axial displacement relative thereto.

18. A mechanism according to claim 13 wherein the sliding pivot bearing consists of a sliding-block member in engagement with the rocking lever and of a swivel joint which connects the rocking lever to the displacement element.

19. A mechanism according to claim 17 wherein a sliding pivot bearing comprises two sliding-block members having a pivot bearing connecting them wherein one of the sliding-block members is in engagement with the displacement element and is provided with a locking device.

20. A mechanism according to claim 17 wherein a sliding pivot bearing comprises two sliding-block members having a pivot bearing connecting them wherein one of the sliding-block members is in engagement with the displacement element and is provided with a locking device while the other sliding-block member is in engagement with a longitudinal guide on the rocking lever.

* * * * *